US008313875B2

(12) United States Patent
Wood et al.

(10) Patent No.: US 8,313,875 B2
(45) Date of Patent: Nov. 20, 2012

(54) HIGH PERFORMANCE CATHODE WITH CONTROLLED OPERATING TEMPERATURE RANGE

(75) Inventors: Anthony Wood, Calgary (CA); Zheng Tang, Calgary (CA); Sofiane Benhaddad, Calgary (CA); Tahir Joia, Calgary (CA); Kyle Marcotte, Calgary (CA); David Waldbillig, Vancouver (CA)

(73) Assignee: Versa Power Systems, Ltd., Calgary, Alberta (CA)

( * ) Notice: Subject to any disclaimer, the term of this patent is extended or adjusted under 35 U.S.C. 154(b) by 917 days.

(21) Appl. No.: 11/542,102

(22) Filed: Oct. 2, 2006

(65) Prior Publication Data

US 2008/0081243 A1    Apr. 3, 2008

(51) Int. Cl.
*H01M 4/94*    (2006.01)
(52) U.S. Cl. .................. 429/525; 429/523; 429/488
(58) Field of Classification Search ................ 429/523, 429/525
See application file for complete search history.

(56) References Cited

U.S. PATENT DOCUMENTS

| | | | | |
|---|---|---|---|---|
| 3,510,356 A | * | 5/1970 | Richman | 429/505 |
| 3,522,097 A | * | 7/1970 | Tedmon, Jr. et al. | 429/30 |
| 5,589,017 A | | 12/1996 | Minh | |
| 5,589,285 A | * | 12/1996 | Cable et al. | 429/479 |
| 5,676,806 A | | 10/1997 | Van Berkel et al. | |
| 6,004,696 A | | 12/1999 | Barnett et al. | |
| 6,007,683 A | | 12/1999 | Jankowski et al. | |
| 6,171,721 B1 | * | 1/2001 | Narayanan et al. | 429/432 |
| 6,183,897 B1 | | 2/2001 | Hartvigsen et al. | |
| 6,420,064 B1 | * | 7/2002 | Ghosh et al. | 429/40 |
| 6,750,169 B2 | | 6/2004 | Ghosh et al. | |
| 6,893,760 B2 | | 5/2005 | Shibata et al. | |
| 7,033,637 B1 | | 4/2006 | Hunt et al. | |
| 7,056,613 B2 | | 6/2006 | Bai et al. | |
| 2001/0044041 A1 | | 11/2001 | Badding et al. | |
| 2001/0044043 A1 | | 11/2001 | Badding et al. | |
| 2003/0165732 A1 | | 9/2003 | McElroy | |
| 2004/0142229 A1 | | 7/2004 | Herman et al. | |
| 2004/0161641 A1 | * | 8/2004 | Lee et al. | 429/12 |
| 2007/0031722 A1 | * | 2/2007 | Adzic et al. | 429/44 |
| 2007/0160884 A1 | | 7/2007 | Aoyama et al. | |

(Continued)

FOREIGN PATENT DOCUMENTS

DE    101 63 013 A1    7/2003

(Continued)

OTHER PUBLICATIONS

Li, S. et al., "New Sulfur-Tolerant Electrode Materials for $H_2S$ Removal and SOFCs", *Electrochemical Society Proceedings*, vol. 2002-26, pp. 113-121

(Continued)

*Primary Examiner* — Barbara L. Gilliam
*Assistant Examiner* — Zachary Best
(74) *Attorney, Agent, or Firm* — Kilpatrick Townsend & Stockton LLP (57) ABSTRACT

In a solid oxide fuel cell having an anode, a cathode, and a dense electrolyte disposed between the anode and the cathode, the cathode having a ceramic-ionic conducting phase of a plurality of ionic conducting particles and a metallic phase of a plurality of metallic particles. The metallic phase includes a metal alloy having an oxide-to-metal transition temperature in the range of about 600° C. to about 800° C. With this cathode, solid oxide fuel cell operating temperatures as low as about 600° C. may be possible.

6 Claims, 10 Drawing Sheets

U.S. PATENT DOCUMENTS

2007/0298299 A1    12/2007    Izawa et al.
2008/0081243 A1    4/2008    Wood et al.

FOREIGN PATENT DOCUMENTS

| | | |
|---|---|---|
| EP | 1127382 B1 | 8/2001 |
| EP | 1486577 A1 | 12/2004 |
| EP | 1786056 A1 | 5/2007 |
| JP | 2005050636 | 2/2005 |
| JP | 2005327507 | 11/2005 |
| JP | 2005327637 | 11/2005 |
| WO | WO 9840921 A | 9/1998 |

OTHER PUBLICATIONS

Chang, C. et al., "Cathode Performance and Oxygen-Ion Transport Mechanism of Copper Oxide for Solid-Oxide Fuel Cells", *J. Solid State Electrochem*, (2003) 7: 125-128.

Belyaev, V. D. et al., "Oxidative Conversion of Methane on Cu and Ag-Ni Electrodes at Articificial Unsteady-State Mode of the SOFC Reactor Operation", *New Aspects of Spillover Effect of Catalysis*, Elsevier Science Publishers B.V., pp. 213-216 (1993).

Smith, M. et al., "Sulfur-Tolerant Cermet Anodes", *Electrochemical Society Proceedings*, vol. 2005-07, pp. 1437-1443.

Baker, R. et al., "Classification Criteria for Solid Oxide Fuel Cell Electrode Materials," *J. Electrochem. Soc.*, 144, (7), pp. 2427-2432 (Jul. 1997)

Simner, S.P. et al., "Performance Variability of La(Sr)FeO$_3$ SOFC Cathode with Pt, Ag, and Au Current Collectors," *J. Electrochem. Soc.*, 152 (9) A1851-A1859 (2005).

Hatchwell, C. et al., "Current Collectors for a Novel Tubular Design of Solid Oxide Fuel Cell," *J. Power Sources*, 77 (1999) 64-68.

Hatchwell, C. et al., "Current Collectors for a Novel Tubular Design of Solid Oxide Fuel Cell", *Journal of Power Sources*, 77 (1999) 64-68.

Baker, R. et al., "Classification Criteria for Solid Oxide Fuel Cell Electrode Materials", *J. Electrochem. Soc.*, vol. 144, No. 7, (1997) 2427-2432.

Kilbride, I.P., "Preparation and Properties of Small Diameter Tubular Solid Oxide Fuel Cells for Rapid Start-Up", *Journal of Power Sources*, 61 (1996) 167-171.

Haanappel, V.A.C. et al., "The Influence of Noble-Metal-Containing Cathodes on the Electrochemical Performance of Anode-Supported SOFCs", *Journal of Power Sources*, 130 (2004) 119-128.

Hatchwell, C.E. et al., "Cathode Current-Collectors for a Novel Tubular SOFC Design", *Journal of Power Sources*, 70 (1998) 85-90.

Indacochea, J. E. et al., "Interface Development in Joining Yttria Stabilized Zirconia to Stainless Steel by In-Situ Alloying with NilTi Filler Metals," Diffusion and Defect Data. Solid State Data. Part B. Solid State Phenomena, Vaduz, Li. vol. 127, May 18, 2006, pp. 19-24.

\* cited by examiner

HIGH PERFORMANCE CATHODE WITH CONTROLLED OPERATING TEMPERATURE RANGE

BACKGROUND OF THE INVENTION

1. Field of the Invention

This invention relates to composite electrodes for use with solid-state ionic devices. More particularly, this invention relates to composite electrodes for use with solid oxide fuel cells. More particularly yet, this invention relates to composite cathode electrodes for use with solid oxide fuel cells.

2. Description of Related Art

Solid state ionic devices typically consist of a fully dense electrolyte sandwiched between thin electrode layers. It is well known that the principal losses in most solid state ionic devices occur in the electrodes or the electrode/electrolyte interfaces. Thus, minimization of these losses is critical to efficient operation of these devices.

A solid oxide fuel cell is a solid electrochemical cell comprising a solid gas-impervious electrolyte sandwiched between a porous anode and porous cathode. Oxygen is transported through the cathode to the cathode/electrolyte interface where it is reduced to oxygen ions, which migrate through the electrolyte to the anode. At the anode, the ionic oxygen reacts with fuels such as hydrogen or methane and releases electrons. The electrons travel back to the cathode through an external circuit to generate electric power.

Conventional solid oxide fuel cells, although operable at temperatures in the range of about 600° C. to about 1000° C., generally exhibit high performance at operating temperatures only in the range of about 800° C. to about 1000° C. However, operation at such high temperatures causes physical or chemical degradation of the fuel cell construction materials. Thus, reducing the operating temperature of a solid oxide fuel cell to reduce such physical or chemical degradation and still maintain high performance levels is highly desirable. However, at reduced operating temperatures, e.g. 700° C., electrode reaction rates of conventional solid oxide fuel cells decrease significantly, substantially reducing cell performance.

It is well known to provide activated components on and/or within the fuel cell electrodes to support the electrochemical process. On the anode side, nickel is commonly used as a catalyst for oxidation of the fuel. On the cathode side, ceramic cathode materials, such as perovskites, typically employed in solid oxide fuel cells have a high activation energy for oxygen reduction. The activation energy for the oxygen reduction reaction may be reduced by adding noble metals such as Au, Ag, Pt, Pd, Ir, Ru, and other metals or alloys of the Pt group.

Efforts to increase electrode reactivity at lower temperatures have focused on optimizing the electrode microstructure and by introducing catalytic materials into the electrode structure. One such effort has resulted in the development of the electrode described and claimed in U.S. Pat. No. 6,420,064 B1 to Ghosh et al., the teachings of which are incorporated by reference herein in their entirety. The Ghosh et al. patent teaches an electrode for a solid oxide fuel cell, which electrode comprises a porous three-dimensional solid phase comprising an electrocatalytic phase comprising a plurality of electrocatalytic particles and an ionic conducting phase comprising a plurality of ionic conducting particles, wherein the phases are interspersed, and the mean or median size of the electrocatalytic particles is substantially equal to or larger than the mean or median size of the ionic conducting particles. In accordance with one embodiment, the electrode is a cathode comprising palladium (Pd) and yttria-stabilized zirconia (YSZ). This cathode is said to significantly improve the cell performance in the operating temperature range of about 725° C. to about 850° C. compared with conventional ceramic cathodes. However, at these temperatures, ferritic stainless steels that are low cost and commercially available have excessive corrosion rates that limit the solid oxide fuel cell device lifetime. Thus, it is desirable to be able to operate the cell at even lower temperatures, where corrosion rates are lower. In particular, operation in the 600° C. to 800° C. operating temperature range is desirable. Unfortunately, below about 700° C., the cathode has low electrochemical activity.

SUMMARY OF THE INVENTION

It is, thus, one object of this invention to provide an electrode for a solid oxide fuel cell which is capable of operating with higher electrochemical activity than conventional solid oxide fuel cell electrodes in the temperature range of about 600° C. to about 800° C.

It is another object of this invention to provide a solid oxide fuel cell and solid oxide fuel cell stack able to operate at higher performance levels than conventional solid oxide fuel cells and conventional solid oxide fuel cell stacks in the temperature range of about 600° C. to about 800° C.

It is yet another object of this invention to provide a solid oxide fuel cell and solid oxide fuel cell stack able to operate at higher performance levels than conventional solid oxide fuel cells and conventional solid oxide fuel cell stacks at temperatures less than about 725° C.

Accordingly, this invention is directed to a solid oxide fuel cell electrode comprising means for enabling long term operation of the electrode and the solid oxide fuel cell at higher performance levels than conventional solid oxide fuel cells in a temperature range of about 600° C. to about 800° C., and more particularly in a temperature range of about 600° C. to about 725° C.

This invention also is directed to an electrode having a microstructure which achieves a high density of active electrochemical reaction sites between the electrolyte and the electrode, which incorporates electrocatalytic materials such as noble metals into the electrode in an intimate fashion, and which includes means for enabling long term operation of the electrode with higher electrochemical activity than conventional electrodes in the temperature range of about 600° C. to about 800° C., and more particularly in a temperature range of about 600° C. to about 725° C.

Although not wishing to be bound by any particular theory of cathode operation, we believe that, due to a metal(Me)-metal(MeO) oxide transition in the cathode at solid oxide fuel cell operating conditions, metal particles at the cathode effectively grab oxygen from the oxidant (air) and form a chemisorbed bond, Me-O, at the cathode surface. Compared with traditional cathode materials, dissociating molecular oxygen from the air to form physically absorbed atomic oxygen at the surface of the catalyst such as strontium doped lanthanum manganite (LSM) is usually the rate limiting step for the cathodic half cell reaction. We also believe that the oxide-to-metal transition temperature of the metal (and its oxide) is a key factor affecting the electrochemical performance of the cathode. We have discovered that by using alloys, the oxide transition temperature can be lowered or, if desired, raised, by means of which the optimum operating conditions, such as temperature and pressure, of the solid oxide fuel cell can be tailored.

Accordingly, in one aspect of this invention, the invention comprises an electrode forming part of a solid oxide fuel cell comprising a dense electrolyte layer, which electrode comprises a porous three-dimensional solid phase comprising an electrocatalytic phase comprising a plurality of electrocatalytic particles, an ionic conducting phase comprising a plurality of ionic conducting particles, and operates at a temperature in the range of about 600° C. to about 800° C.

In another aspect of the invention, the invention comprises a solid oxide fuel cell having an anode, a cathode, and a dense electrolyte disposed between the anode and the cathode, wherein the cathode comprises a ceramic-ionic conducting phase comprising a plurality of ionic conducting particles and a metallic phase comprising a plurality of metallic particles, and wherein the metallic phase comprises at least one of a metal and a metal alloy having an oxide-to-metal transition temperature in the range of about 600° C. to about 800° C.

The electrode of this invention may be prepared by any method known to those skilled in the art including conventional ceramic processing followed by firing, chemical vapor deposition (CVD), plasma spraying, etc. The electrode of this invention may be formed by mixing ceramic ionic conducting particles and metallic electrocatalyst particles into a composite electrode which is then applied to a dense electrolyte substrate by screen printing or by similar well known methods. The resulting electrode microstructure is highly porous and includes very long three-phase boundaries, direct ion conducting channels from the catalytic sites to the electrolyte and direct electron conducting channels through the electrode to the catalytic sites. Preferably, the electrocatalyst particles are larger than the ionic conducting particles.

The metallic electrocatalyst particles in accordance with one embodiment of this invention may comprise substantially pure metal which, when exposed to certain conditions, such as elevated pressures, has an oxide-to-metal transition temperature in the range of about 600° C. to about 800° C. In accordance with one particularly preferred embodiment of this invention, the metallic electrocatalyst particles comprise a metal alloy having an oxide-to-metal transition temperature in the range of about 600° C. to about 800° C.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

The invention disclosed herein is a solid oxide fuel cell and solid oxide fuel cell stack operating at a temperature in the range of about 600° C. to about 800° C.

The invention disclosed herein is a composite electrode for a solid oxide fuel cell, which electrode, by virtue of its composition, enables operation of the solid oxide fuel cell and solid oxide fuel cell stack at high performance levels at temperatures as low as about 600° C.

Figure 9:
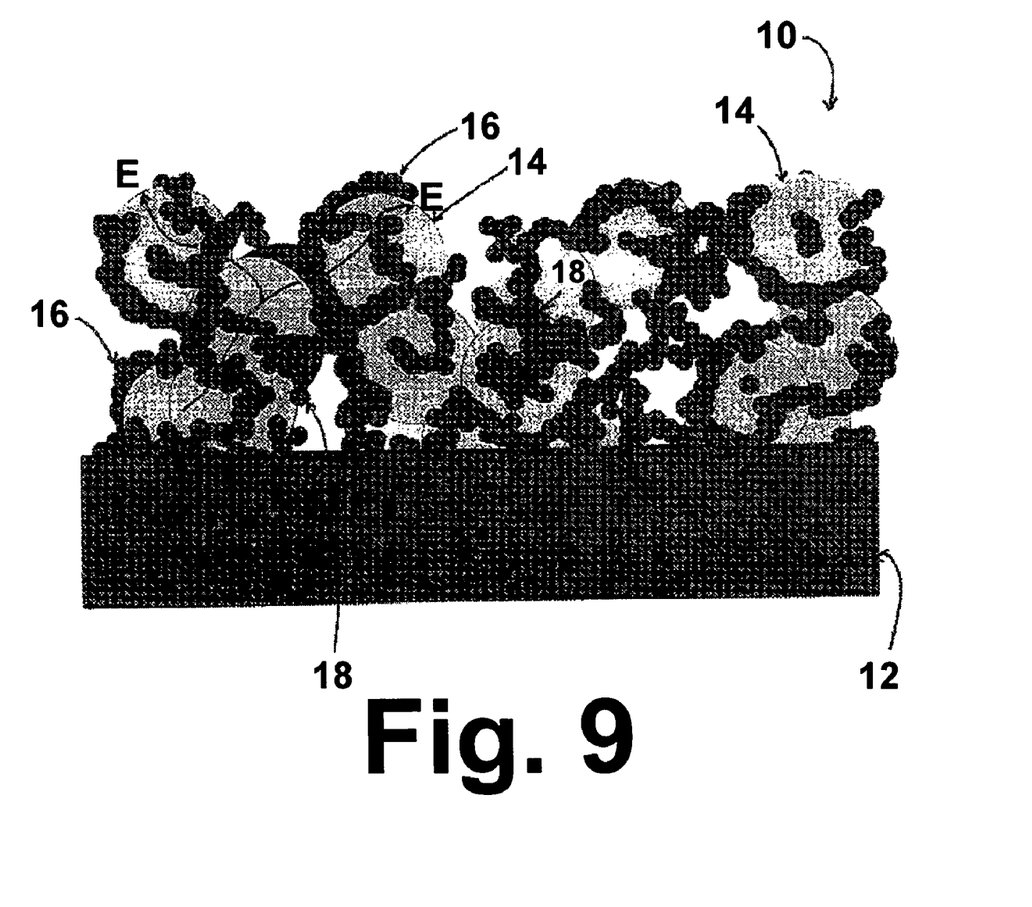
FIG. 9 is a schematic representation of a cross-sectional view of a cathode in accordance with one embodiment of this invention.
Figure 10:
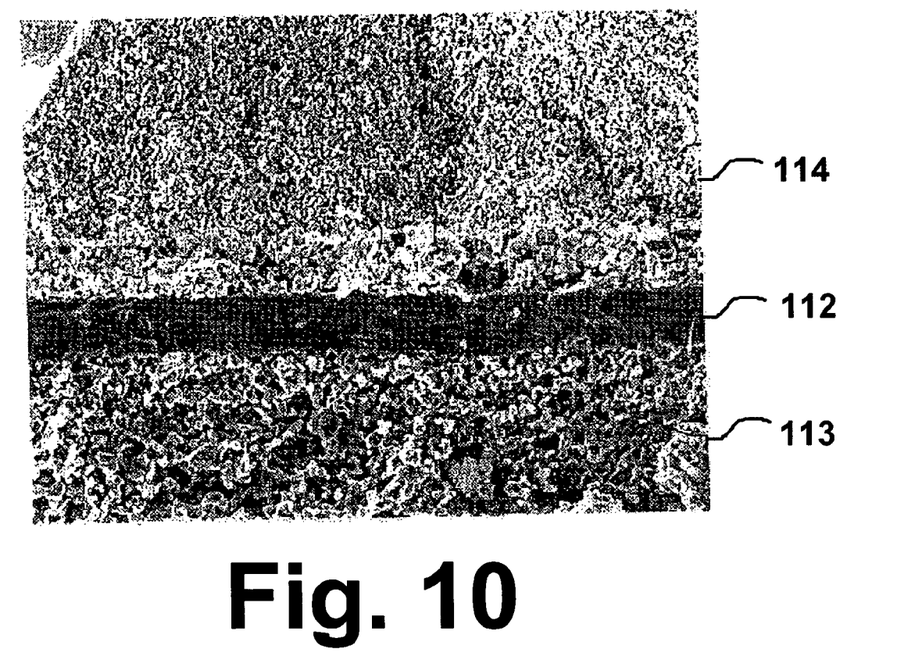
FIG. 10 is a scanning electron micrograph of a solid oxide fuel cell in accordance with one embodiment of this invention.

The solid oxide fuel cell, as shown in FIG. 10, comprises a dense electrolyte layer 112 sandwiched between an anode electrode layer 113 and a cathode electrode layer 114. The cathode layer 10, as depicted in FIG. 9, shown bonded to an electrolyte 12, comprises a ceramic-ionic conducting phase comprising a plurality of ionic conducting particles 16 and a metallic phase comprising a plurality of metallic particles 14. The ionic conducting particles combine to form ionic conducting paths (I) from the electrolyte 12 to the electrochemically active sites 18. The metallic phase forms electronic conducting paths (E) through the electrode 10 to a contact paste (not shown) and cathode electronic conducting strip (not shown). The electrochemically active area coincides with a three phase boundary 18 which extends along the common boundary of the gaseous pore phase, the ceramic phase 16 and the metallic phase 14.

The metallic phase, in accordance with one embodiment of this invention, comprises at least one of a metal and a metal alloy having an oxide-to-metal transition temperature in a range of about 600° C. to about 800° C. In accordance with one embodiment of this invention, the metal or metal alloy comprises a noble metal. In accordance with one preferred embodiment of this invention, the noble metal is selected from the group consisting of silver (Ag), gold (Au), iridium (Ir), osmium (Os), palladium (Pd), ruthenium (Ru), rhodium (Rh) and platinum (Pt). In accordance with one particularly preferred embodiment of this invention, the noble metal is palladium.

More particularly, the invention disclosed herein is a cathode electrode comprising an alloyed metal and YSZ or other ceramic oxide ionic conductor such as gadolinia-doped ceria as the key components whereby the alloyed metal has a lower oxide-to-metal transition temperature at 0.21 atm $pO_2$ than the metal components individually, in the range of about 600° C. to about 800° C. This includes Pd/Ag alloys where the Pd content is greater than about 50% by weight of the alloy, Pd/Au alloys where the Pd content is greater than about 70% by weight of the alloy, Pd/Pt alloys where the Pd content is greater than about 70% by weight of the alloy, and Pd/Cr alloys or Pd/Nb alloys wherein the Pd content is greater than about 80% by weight of the alloy.

As previously indicated, the electrode of this invention is formed by mixing ceramic ionic conducting particles and metallic electrocatalyst particles into a composite electrode which is then applied to a dense electrolyte substrate. In accordance with one embodiment of this invention, the ionic conducting particles comprise ceramic particles which may be yttria stabilized zirconia and the metallic electrocatalyst particles are particles of a metal alloy comprising at least one noble metal. In accordance with one embodiment, the mixture comprises metallic particles ranging in size from about 1-2 microns in diameter and 8 mol % yttria stabilized zirconia (8YSZ) particles ranging in size from about 0.1 to about 0.3 microns in diameter. The preferred microstructure in accordance with one embodiment of this invention comprises about 1-10 vol % Pd and 40-80 vol % YSZ balanced with about 20-50 vol % porosity. It should be noted that all references herein to volume percentages of the electrocatalyst phase and the ionic conducting phase are of the volume of the entire solid phase.

The cathode layer in accordance with one embodiment of this invention has a thickness of less than about 10 microns, preferably less than about 5 microns. It is screen-printed and co-sintered with a screen-printed electrolyte layer (8YSZ), screen-printed anode functional layer and tape-casted anode substrate. A layer of ionic conducting ceramic materials (perovskites) is printed on the other surface after co-firing. The perovskite particles enter the cathode porous structure during the printing process. The layer is then fired in-situ at the operating temperature of the tri-layer, about 600° C. to about 850° C. This layer provides electrical contact from the cathode to the bipolar plates of the fuel cell stack (interconnects).

Due to its materials composition, the majority of the cathode materials (YSZ) is the same as the electrolyte materials. During the co-firing, sufficient sintering between the cathode and electrolyte occurs, creating a strong interface that is less prone to mechanical and thermal mechanical failure during stack assembly and operation.

Figure 1:
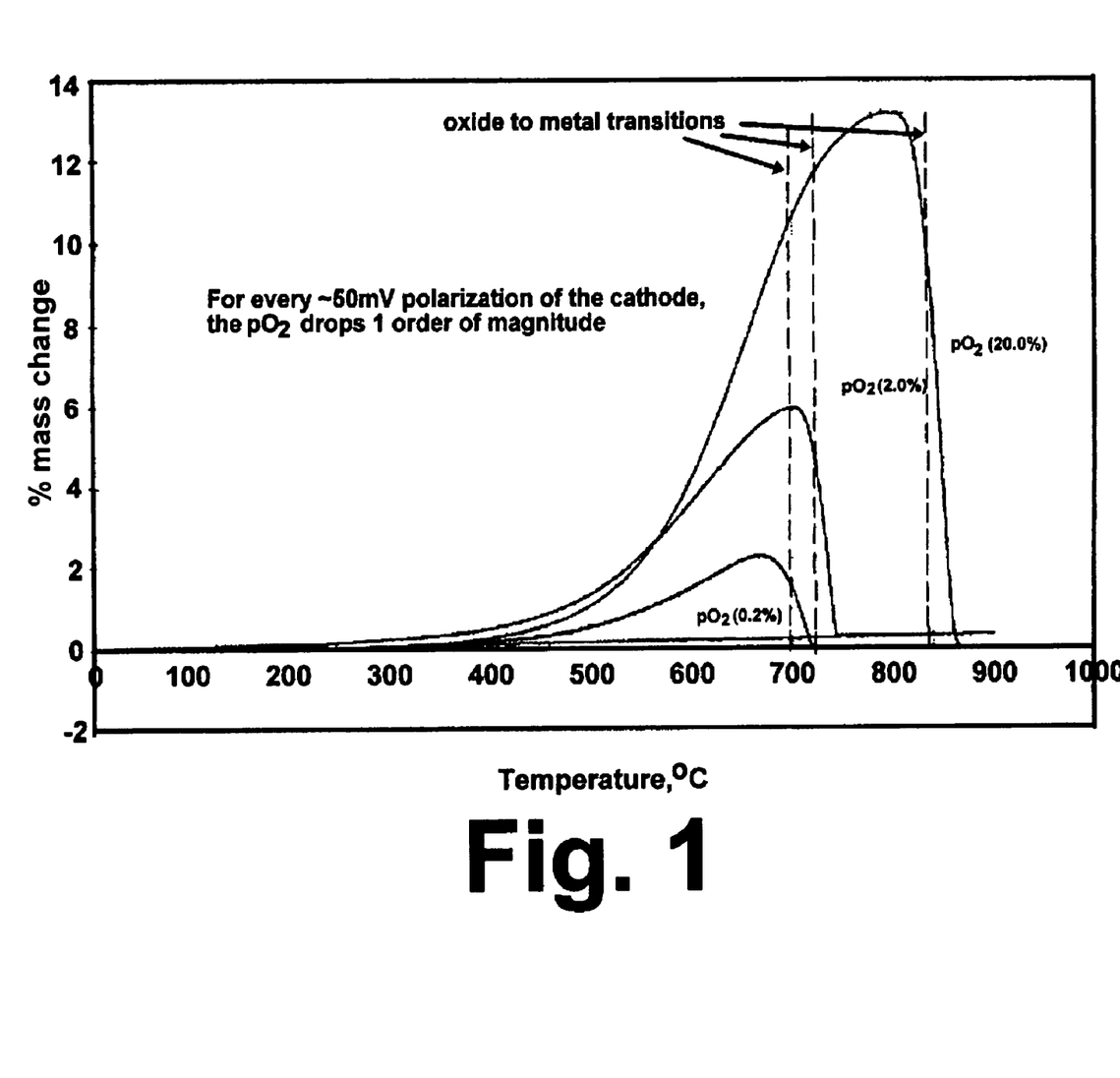
FIG. 1 is a diagram showing a thermogravimetric (TG) analysis of palladium powder at various oxygen partial pressures.

FIG. 1 is a diagram showing a thermogravimetric (TG) analysis of palladium powder at various oxygen partial pressures. As shown therein, as the cathode is polarized, the oxygen partial pressure falls in the cathode in accordance with the Nernst equation. Within the solid oxide fuel cell operating temperature range of about 725° C. to about 850° C., approximately every 50 mV polarization produces an order of magnitude lower oxygen partial pressure (effectively) in the cathode, although the exact value varies with temperature. FIG. 1 shows a significant lowering of the oxide-to-metal transition temperature (dashed lines) as $pO_2$ is lowered over 2 orders of magnitude (approximately equivalent to about 100 mV cathode polarization). Based upon these results, it is reasonable to expect similar performance in a solid oxide fuel cell stack operation and it establishes a lower temperature limit of about 700° C. to about 725° C. required for metallic palladium.

Figure 2:
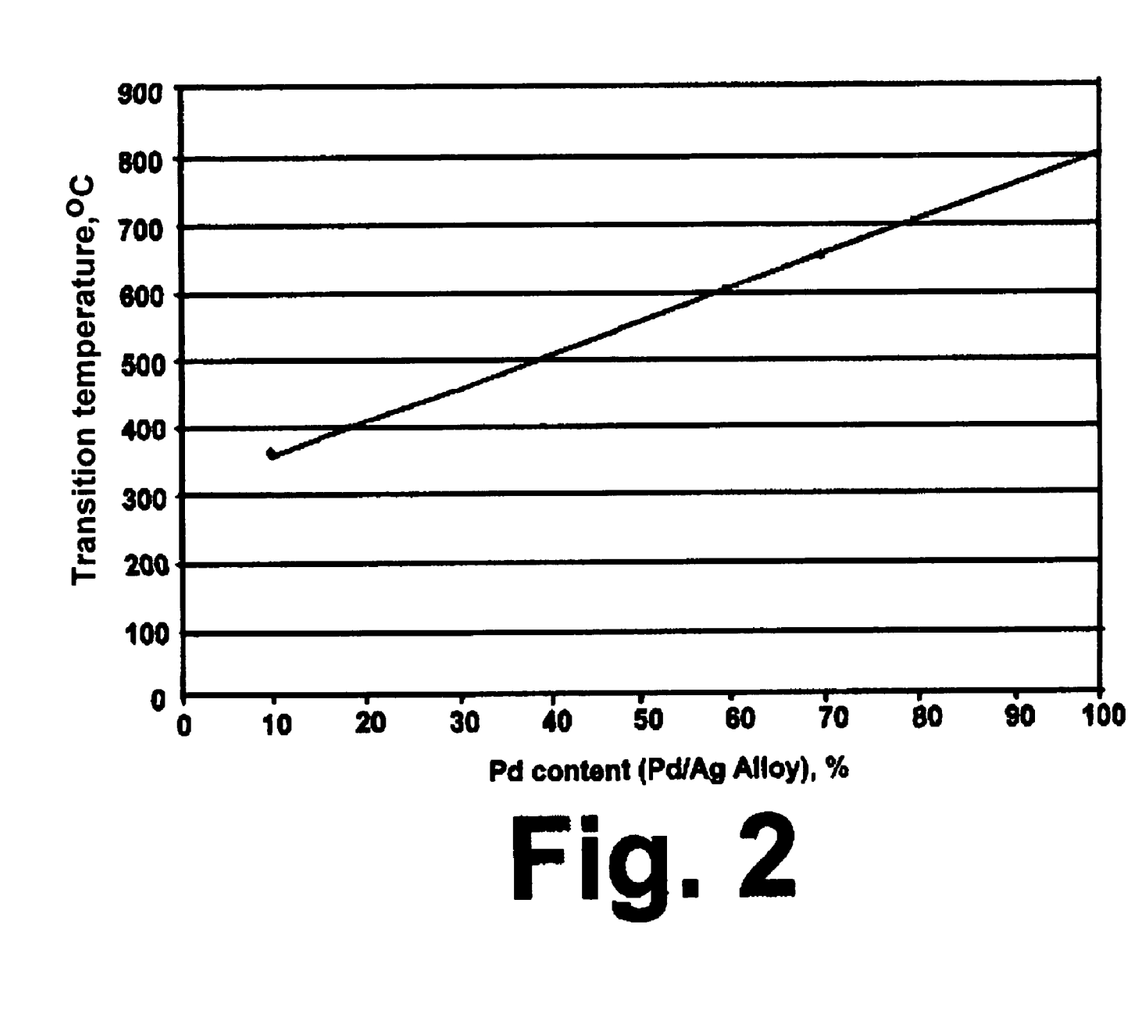
FIG. 2 is a diagram showing the metal oxide-to-metal transition temperature as a function of Pd content of Pd/Ag alloys.

We have discovered that even lower operating temperatures, in the range of about 600° C. to about 650° C., may be achieved by alloying the palladium or choosing other precious metal alloys for use as an electrocatalyst in the cathode. FIG. 2 shows that by alloying palladium with silver (Ag), the oxide-to-metal transition temperature can be significantly lowered. For an alloy comprising 70 wt % Pd and 30 wt % Ag, the oxide-to-metal transition temperature is reduced from 800° C. for Pd metal alone to about 650° C. for the alloy.

Figure 3:
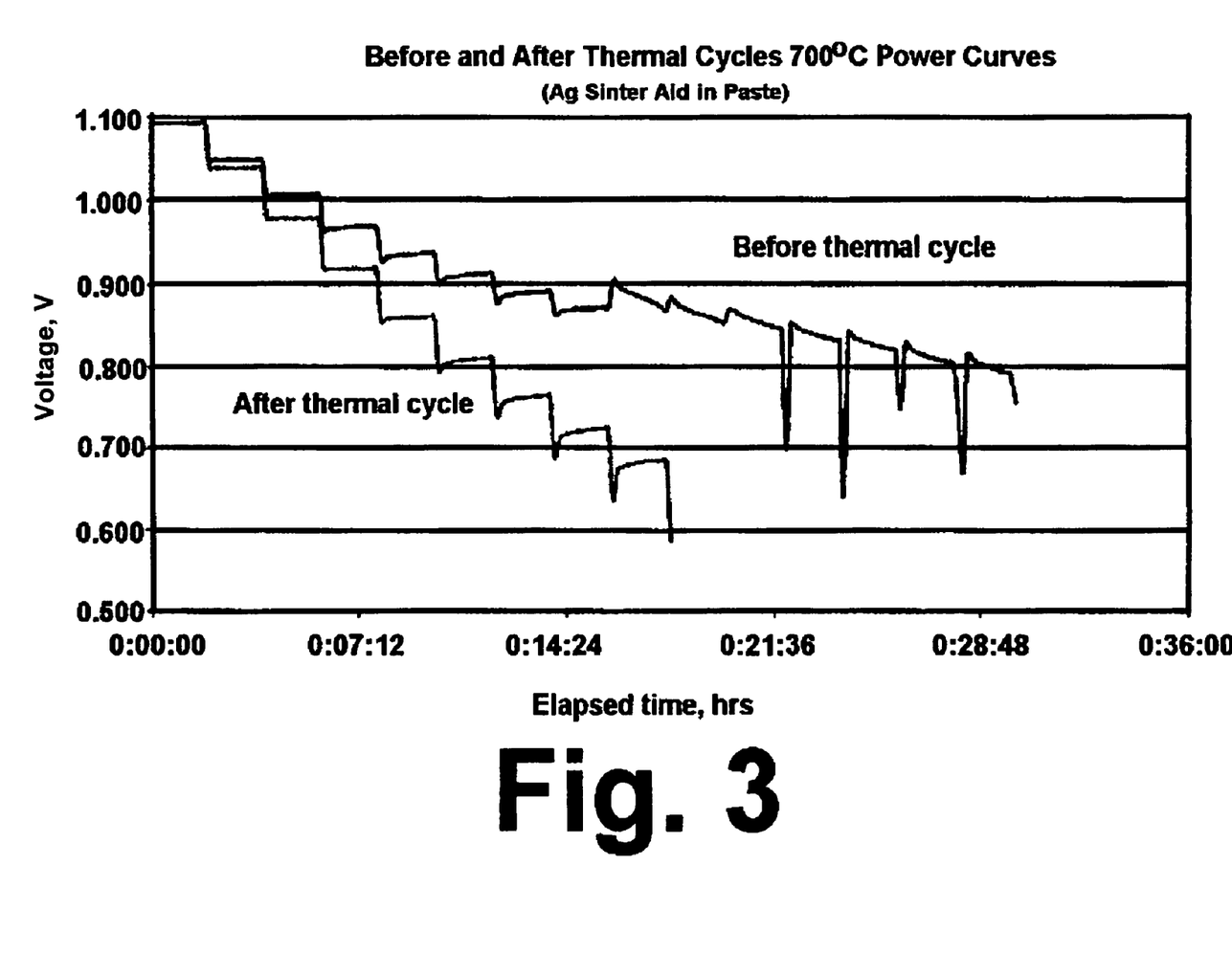
FIG. 3 is a diagram showing cell voltage versus time at 700° C. with 4A current steps at two (2) minute intervals.
Figure 4:
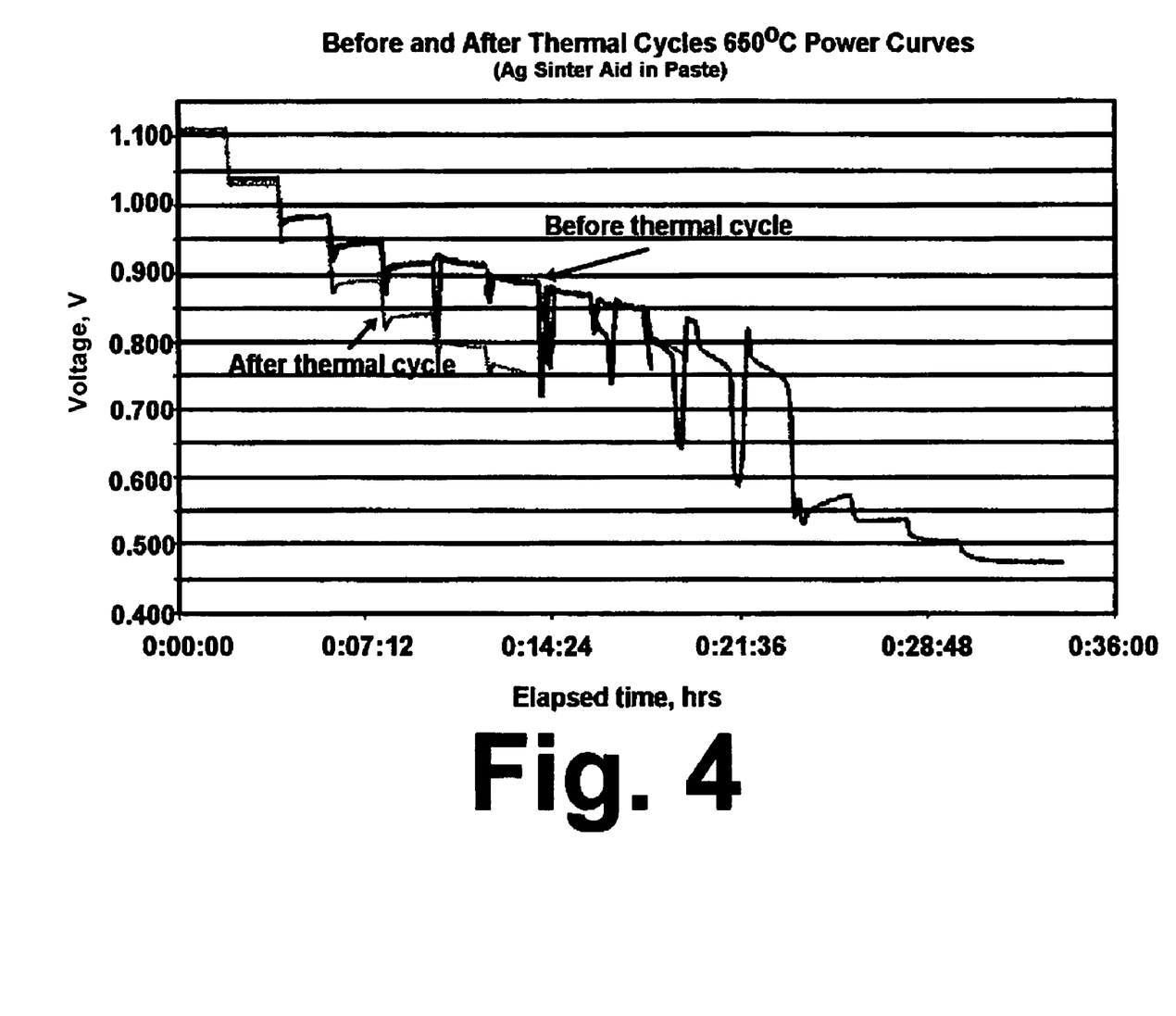
FIG. 4 is a diagram showing cell voltage versus time at 650° C. with 4A current steps at two (2) minute intervals.
Figure 5:
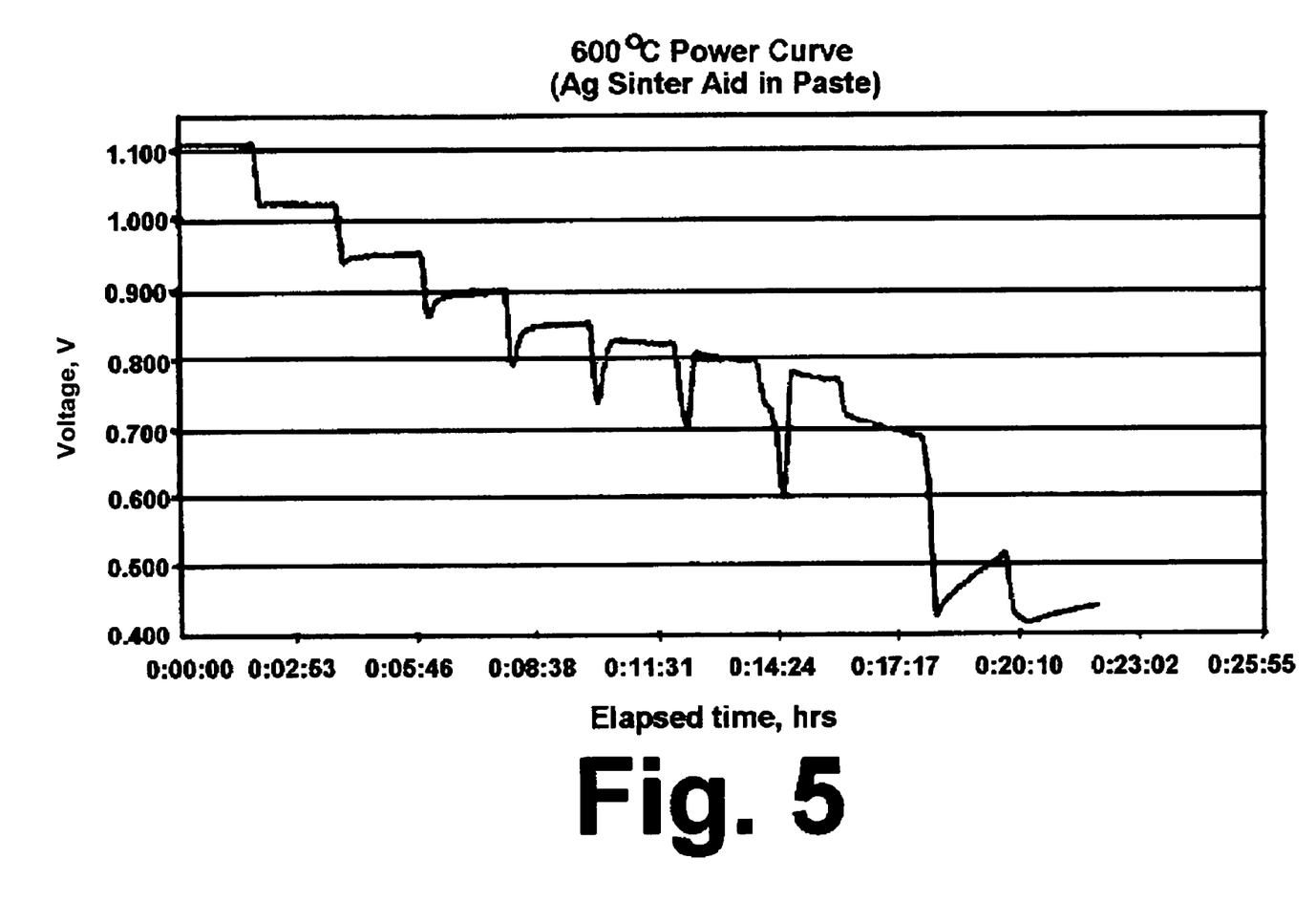
FIG. 5 is a diagram showing cell voltage versus time at 600° C. with 4A current steps at two (2) minute intervals.
Figure 6:
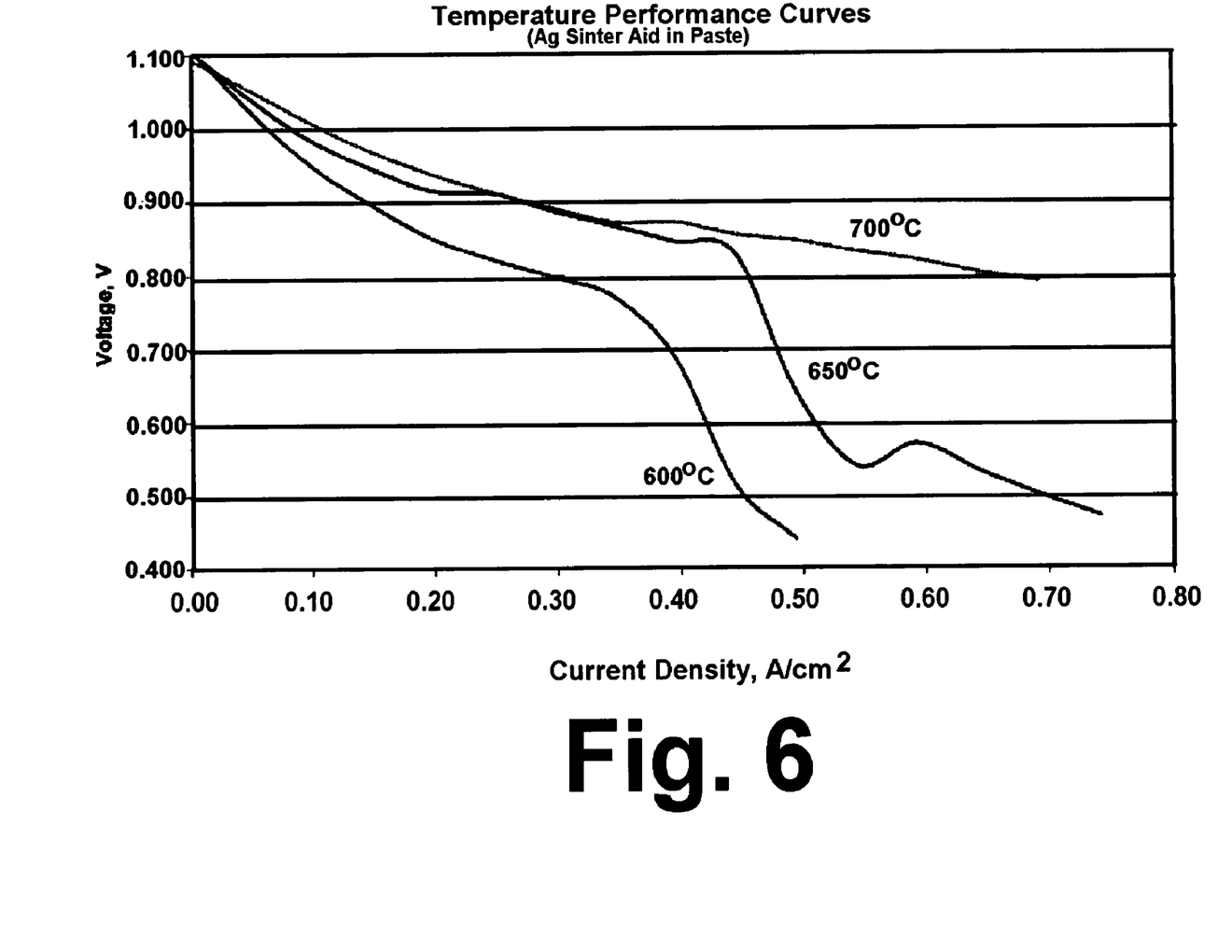
FIG. 6 is a diagram showing current-voltage curves at temperatures in the range of about 600° C. to about 700° C.

A single cell test was conducted using a cathode contact of perovskites and 10% v/v silver addition for the dual purpose of a sinter aid for the perovskite powder (silver has a low melting point of 962° C.) and potentially to modify the oxide transition temperature of palladium in the cathode, allowing the cell to operate at lower temperatures. FIGS. 3-5 show cell voltage stepped by 4A every two minutes at temperatures of 700, 650 and 600° C., respectively. The large increases in cell voltage with current increase is due to increases in overpotential at the cathode, lowering the $pO_2$ and causing an oxide-to-metal transition which decreases overvoltage, thereby increasing cell voltage. Over time, oxide reforms, again lowering cell voltage, and the cycle is repeated at the next current load step. FIG. 6 shows current-voltage data for the temperature range of about 600° C. to about 700° C. These tests, together with TG measurements demonstrating a lowering of oxide transition temperature for a Pd/Ag alloy cathode, suggest that any method of lowering the oxide-to-metal transition temperature while maintaining cathode microstructure will result in an improved low temperature cathode, which, in turn, should lead to lower degradation rates due to operation at lower temperatures.

Figure 7:
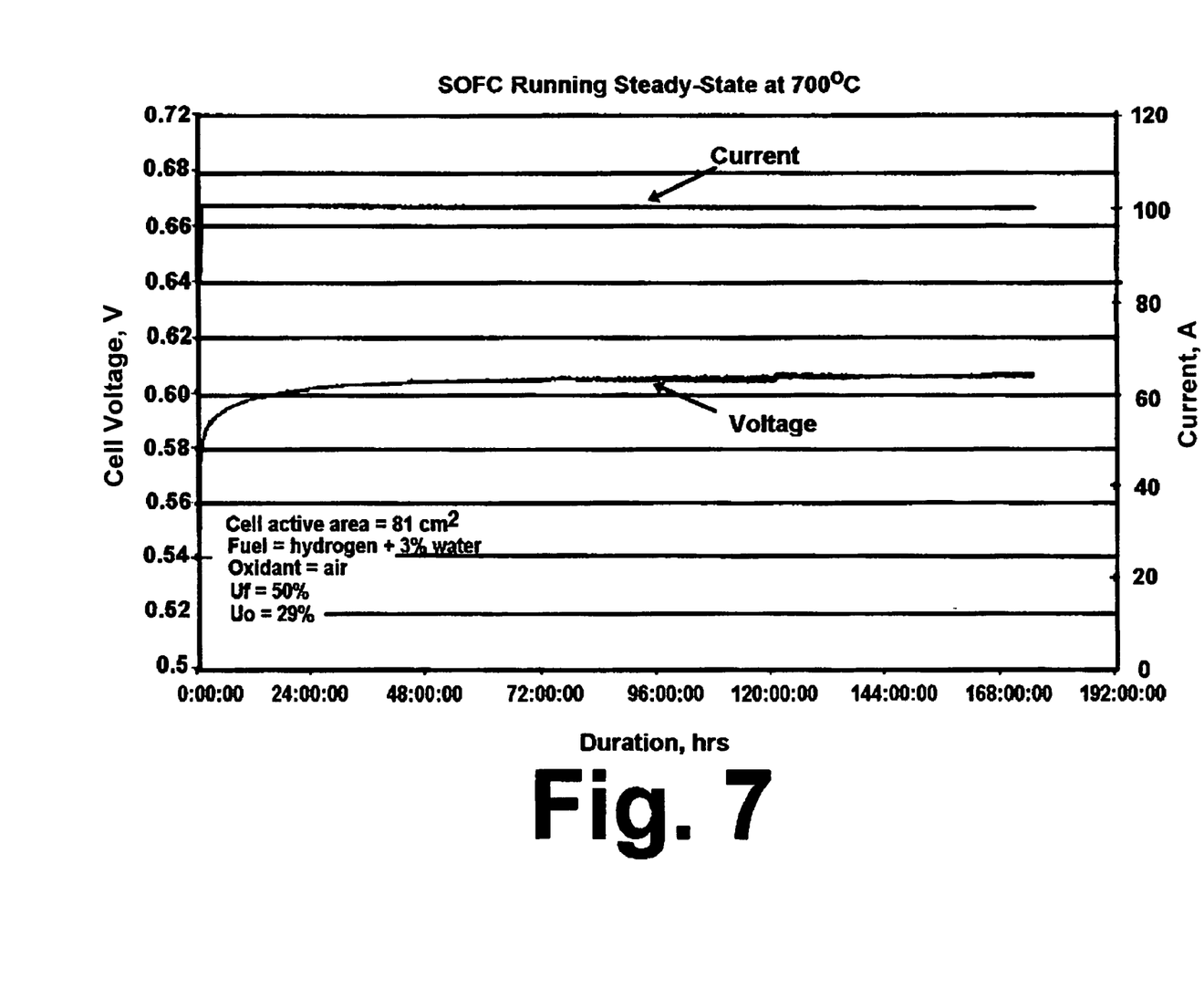
FIG. 7 is a diagram showing the steady state voltage and current for a solid oxide fuel cell having a Pd-YSZ cathode operating at a temperature of about 700° C.

FIG. 7 shows a cell with a Pd-YSZ cathode operating at 100 A (1.23 A/cm$^2$) and 700° C. As can be seen, cell voltage increased from about 591 mV to about 605 mV in about two days, and one week later was running at 607 mV with no degradation. Unexpectedly, the degradation rate at 100 A and 700° C. is lower than at 40.5 A (0.5 A/cm$^2$) and 750° C. (not shown) despite operating at about 2.5 times the current density. This suggests that oxide transition is a limiting factor in reducing cell operation of a Pd cathode and that the oxide-to-metal transition temperature of Pd can be reduced to 700° C. by imposing >100 mV polarization at the cathode. At such high current density, the cathode polarization exceeds this value and, thus, the cell is stable. At this temperature and 0.5 A/cm$^2$, the cell degrades rapidly.

Cell tests have shown reversible degradation below 700° C. due to the cathode. In one test, a cell was cycled between 650° C. and 750° C. at 0.5 A/cm$^2$ and showed very high degradation at 650° C., but on returning to 750° C., the cell voltage was within 1 mV of the voltage previously at 750° C., indicating reversible degradation at 650° C. This is due to the palladium-to-palladium oxide reversible transition and data from this test is summarized in Table 1.

TABLE 1

| | Steady State | | | |
|---|---|---|---|---|
| | Voltage | Shunt | Time Elapsed | %/1000 hr |
| Start 650° C. | 0.646 | 40.50 | N/A | N/A |
| End | 0.597 | 40.50 | 96 | 79.0 |
| Start 750° C. | 0.855 | 40.50 | N/A | N/A |
| End | 0.835 | 40.50 | 24 | 97.5 |
| Start 650° C. | 0.648 | 40.50 | N/A | N/A |
| End | 0.600 | 40.50 | 48 | 154.3 |
| Start 750° C. | 0.836 | 40.50 | N/A | N/A |
| End | 0.832 | 40.50 | 24 | 19.9 |
| Start 650° C. | 0.647 | 40.50 | N/A | N/A |
| End | 0.586 | 40.50 | 48 | 196.4 |
| Start 750° C. | 0.831 | 40.50 | N/A | N/A |
| End | 0.827 | 40.50 | 24 | 20.1 |
| Start 650° C. | 0.641 | 40.50 | N/A | N/A |
| End | 0.576 | 40.50 | 48 | 211.3 |
| Start 750° C. | 0.911 | 40.50 | N/A | N/A |
| End | 0.906 | 40.50 | 72 | 7.6 |

Note:
Time is calculated in 24 hr increments

Figure 8:
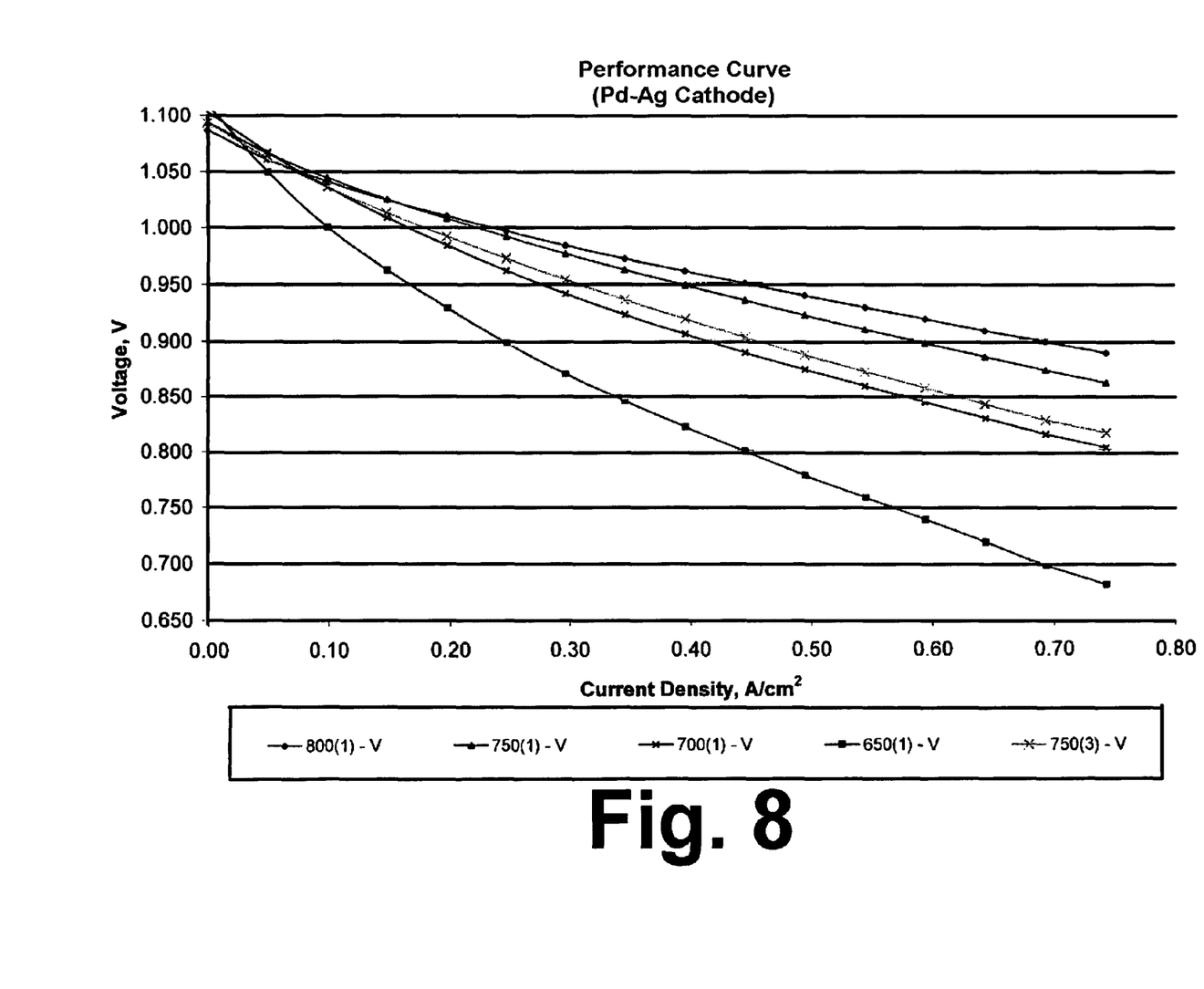
FIG. 8 is a diagram showing current-voltage curves for a cell at temperatures in the range of about 650° C. to about 800° C. with a Pg/Ag cathode (70:30% w/w in alloy powder)

FIG. 8 shows VII curves for a cell with a Pd—Ag cathode (70:30% w/w in alloy powder). The cell has a voltage of 801 mV at 700° C. and 0.74 A/cm$^2$. The cell became unstable when run long term at low temperature (650° C.), after which time powder curves were repeated and cell voltage dropped to 715 mV at the same condition, indicating that the electrode is unstable. But, when the alloy is stable and its oxide transition temperature is as low as for Pd—Ag (70:30), i.e. 650° C., low temperature cell performance is possible.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

We claim:

1. In a solid oxide fuel cell having an anode, a cathode, and a dense electrolyte disposed between said anode and said cathode, the improvement comprising:
said cathode comprising a ceramic-ionic conducting phase comprising a plurality of ionic conducting particles and a metallic phase comprising a plurality of metallic particles, said metallic phase comprising a metal alloy having an oxide-to-metal transition temperature in a range of about 600° C. to about 800° C., wherein said metal alloy is selected from a group consisting of:
80% to 99% Pd and 20% to 1% Cr, by weight; and
80% to 99% Pd and 20% to 1% Nb, by weight.

2. A solid oxide fuel cell in accordance with claim 1, wherein said ionic conducting particles and said metallic particles are interspersed and the mean size of the metallic particles is one of substantially equal to and greater than the mean size of said ionic conducting particles.

3. A solid oxide fuel cell in accordance with claim 1, wherein said cathode has a thickness less than about 10 μm.

4. A solid oxide fuel cell in accordance with claim 1, wherein said metal alloy has an oxide-to-metal transition at a $pO_2$ equal to about 0.21 atm, within an operating temperature range of said solid oxide fuel cell.

5. A solid oxide fuel cell in accordance with claim 1, wherein said metal alloy is 80% to 99% Pd and 20% to 1% Cr, by weight.

6. A solid oxide fuel cell in accordance with claim 1, wherein said metal alloy is 80% to 99% Pd and 20% to 1% Nb, by weight.

* * * * *